(12) United States Patent
Peñuela (10) Patent No.: US 11,108,782 B2
(45) Date of Patent: Aug. 31, 2021

(54) METHOD FOR SETTING UP A REMOTE TERMINAL UNIT FOR SOCIAL NETWORKING

(71) Applicant: SCHNEIDER ELECTRIC INDUSTRIES SAS, Rueil Malmaison (FR)

(72) Inventor: Francisco Javier Ramos Peñuela, Seville (ES)

(73) Assignee: Schneider Electric Industries SAS, Rueil Malmaison (FR)

( * ) Notice: Subject to any disclaimer, the term of this patent is extended or adjusted under 35 U.S.C. 154(b) by 97 days.

(21) Appl. No.: 16/375,337

(22) Filed: Apr. 4, 2019

(65) Prior Publication Data

US 2019/0342302 A1 Nov. 7, 2019

(30) Foreign Application Priority Data

May 4, 2018 (EP) .................................... 18305562

(51) Int. Cl.
*H04L 29/06* (2006.01)
(52) U.S. Cl.
CPC .......... *H04L 63/104* (2013.01); *H04L 63/101* (2013.01); *H04L 63/102* (2013.01); *H04L 63/20* (2013.01)
(58) Field of Classification Search
CPC ... H04L 63/104; H04L 63/101; H04L 63/102; H04L 63/20; H04L 51/32
See application file for complete search history.

(56) References Cited

U.S. PATENT DOCUMENTS

| | | | |
|---|---|---|---|
| 9,123,035 B2* | 9/2015 | Penilla | H04W 4/02 |
| 9,912,193 B2* | 3/2018 | Grujovski | H02J 13/00034 |
| 2011/0161478 A1* | 6/2011 | Formo | H04L 67/306 709/223 |
| 2013/0091208 A1* | 4/2013 | Rajakarunanayake | H04L 67/20 709/204 |
| 2013/0091213 A1* | 4/2013 | Diab | H04L 67/306 709/204 |

(Continued)

FOREIGN PATENT DOCUMENTS

| | | |
|---|---|---|
| DE | 10 2011 011896 | 8/2012 |
| DE | 10 2015 118064 | 4/2017 |

OTHER PUBLICATIONS

Extended European Search Report for European Patent Application No. EP18305562 dated Nov. 7, 2018, 9 pages.

(Continued)

*Primary Examiner* — Oleg Korsak
(74) *Attorney, Agent, or Firm* — Locke Lord LLP (57) ABSTRACT

The invention relates to a method for setting up a Remote Terminal Unit for social networking and to a Remote Terminal Unit. The Remote Terminal Unit having a configuration set (122) storing configuration data for a social network platform and participant set (123) storing a list of authorized participant accounts and participant permissions, and a dictionary set (124) storing requests, commands and associated tasks and task types. The RTU further has a controller (121) arranged for registering with the social network platform according to the configuration set (122), and creating and/or joining at least one participant group on the social network platform based on the participant set (123).

11 Claims, 4 Drawing Sheets

(56) References Cited

U.S. PATENT DOCUMENTS

| | | | | |
|---|---|---|---|---|
| 2013/0097269 A1* | 4/2013 | Plotkin | ............. | H04M 1/72547 |
| | | | | 709/206 |
| 2014/0164519 A1* | 6/2014 | Shah | ................... | H04B 5/0031 |
| | | | | 709/204 |
| 2015/0281393 A1* | 10/2015 | Sng | ........................ | H04L 67/22 |
| | | | | 709/204 |
| 2016/0006300 A1* | 1/2016 | Grujovski | ......... | H02J 13/00034 |
| | | | | 307/64 |
| 2017/0012929 A1* | 1/2017 | Shah | ...................... | H04L 67/02 |

OTHER PUBLICATIONS

English Language Machine Translation of German Patent Application Publication No. DE 10 2011 011896, published on Aug. 23, 2012, 15 pages.

English Language Machine Translation of German Patent Application Publication No. DE 10 2015 118064, published on Apr. 27, 2017, 28 pages.

* cited by examiner

METHOD FOR SETTING UP A REMOTE TERMINAL UNIT FOR SOCIAL NETWORKING

The present invention relates to a method for enabling/setting up an automation system for social networking, a substation/automation system accessible through a social network. More in particular, the invention relates to a remote terminal unit enabling social networking for an automation system and a method for configuring a remote terminal unit.

BACKGROUND

Automation systems may be found in building management systems, industrial control systems and substations of electrical installations and energy plants. Such automation systems are provided to perform, control and supervise processes. Access to and interaction with such systems needs to comply with various levels of security and diversified control. A user may e.g. set the temperature in a room to a certain degree, but may not shut down the heating system of a whole building. Whereas a facility manager may be allowed such level of control. Accordingly, access to the management part of an automation system is restricted. Contemporary means for control restrict access in a physical manner, where logging in to a local system via remote terminal units is for example only possible inside a central control room. Following the architecture of such a system, alerts, alarms and other notifications are delivered and collected in the central control room and accordingly require an operator/supervisor to be present in the control room. Furthermore, in order to be able to address issues and solve problems in case of an event, insight in the temporal order and coherence of alerts and alarms is required to provide an overview and to enable proper analysis of the situation.

SUMMARY OF INVENTION

It is an object of the invention to alleviate the disadvantages of accessibility of automation systems, and in particular to provide access to the system in a more convenient way.

In one aspect, the invention relates to a computer Implemented method for setting up a Remote Terminal Unit for social networking. The method comprising providing a configuration set for a social network platform, providing a participant set including a list of authorized participant accounts and participant permissions, and providing a dictionary set including requests, commands and associated tasks and task types. The method further including registering with the social network platform according to the configuration set, and creating and/or joining at least one participant group on the social network platform based on the participant set.

In another aspect, the invention relates to a remote terminal unit (RTU) including a configuration set including configuration data for a social network platform and participant set including a list of authorized participant accounts and participant permissions, and a dictionary set including requests, commands and associated tasks and task types. The remote terminal unit (RTU) further has a controller arranged for registering with the social network platform according to the configuration set, and creating and/or joining at least one participant group on the social network platform based on the participant set.

By providing a method for setting up a remote terminal unit for social networking and a remote terminal unit set up accordingly, accessibility and interaction with a remote terminal unit is facilitated in a less cumbersome way. It further provides a system of connected RTU's that is easily accessible, thereby providing insight in the actions and responses of the system and each RTU therein.

Further objects, aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 1:
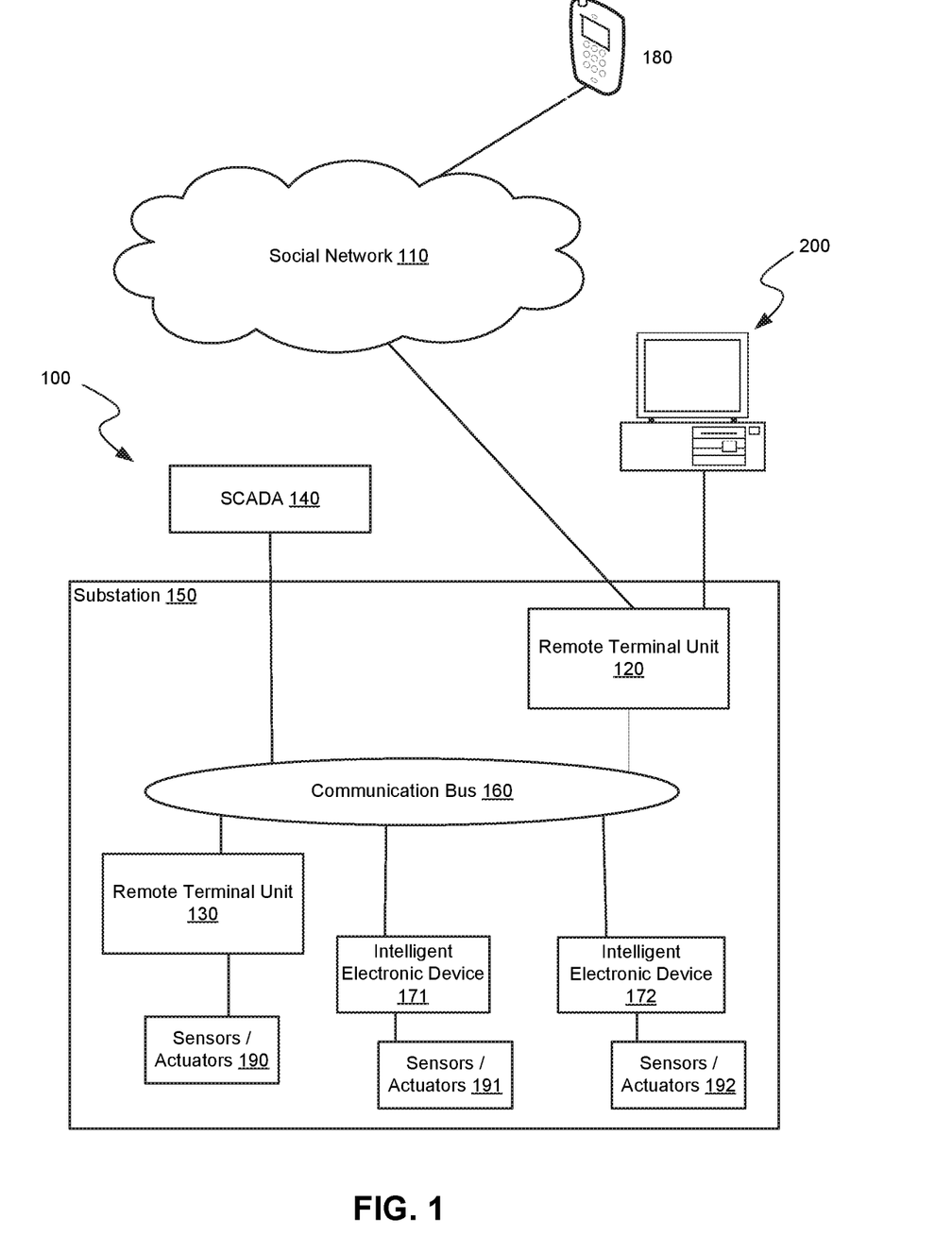
FIG. 1 illustrates schematically an example of an automation system in accordance with the invention.

Referring to FIG. 1, a schematic overview is shown of an automation system 100. The automation system includes a SCADA (Supervisory Control and Data Acquisition) module 140 and a substation 150. The substation 150 includes a number of peripherals, such as sensors and actuators; 190-192. The substation 150 further includes two Remote Terminal Units (RTUs), one RTU 130 for data acquisition from one particular peripheral 190 and one RTU 120 as data concentrator for the complete substation. The other peripherals 191, 192 are respectively connected via two Intelligent Electronic Devices (IED) 171, 172 to a communication bus 160. The communication bus 160 provides communication for the complete substation and all parts of the substation are accordingly connected thereto, whether directly or indirectly. RTU 120 can be connected to from a computer 200, such as a Personal Computer, desktop or laptop or workstation machine, to access and control settings, parameters and a real time data base of the RTU 120. The RTU 120 further exposes the automation system to a social network 110. The social network 110 may be accessed via mobile phone 180 or other suitable equipment.

Figure 2:
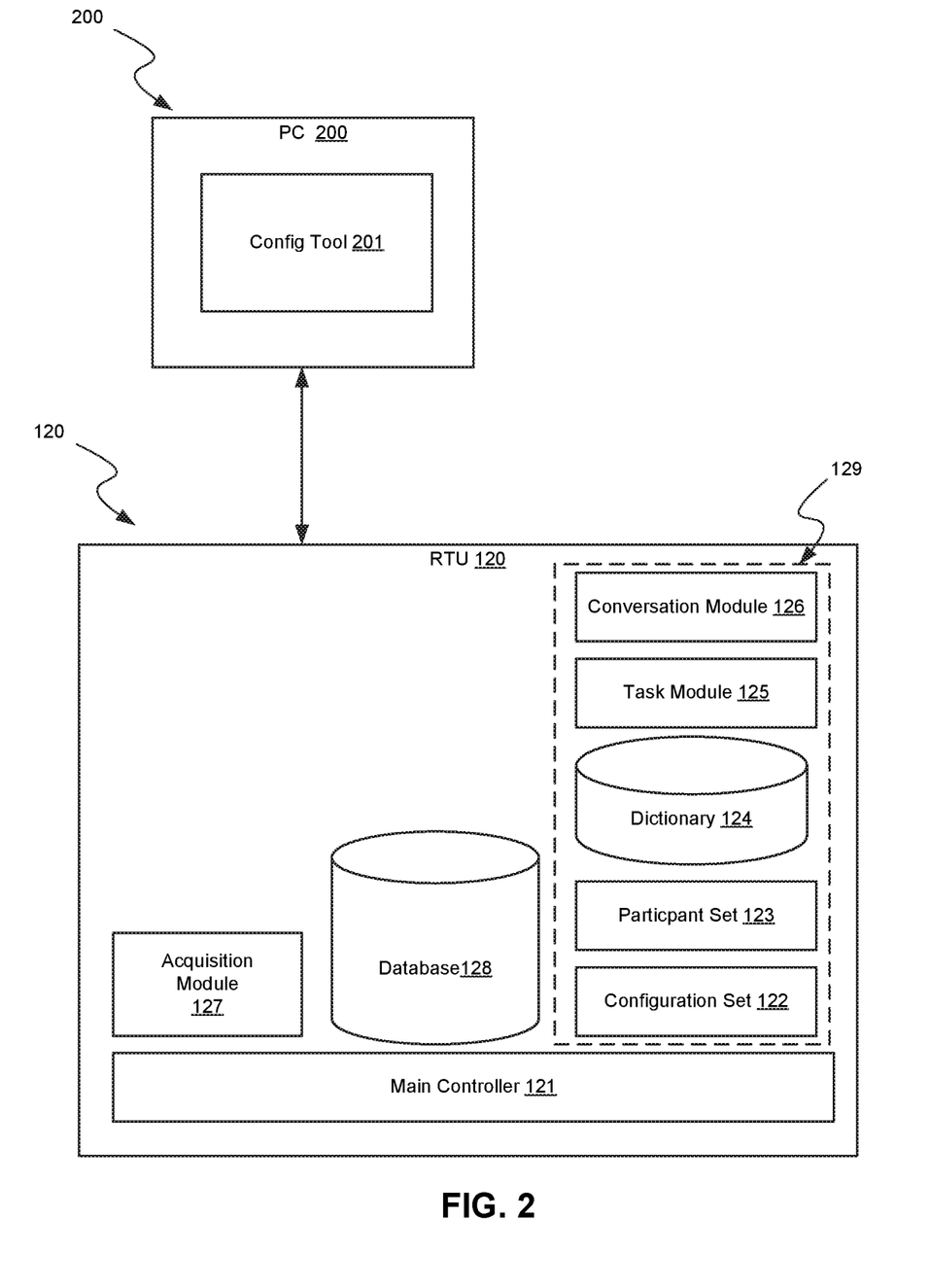
FIG. 2 illustrates schematically an example of a Remote Terminal Unit in accordance with the invention.

Turning to FIG. 2, the Remote Terminal Unit (RTU) 120 of FIG. 1 is shown in more detail. The RTU 120 includes a main communication controller 121, an acquisition module 127, a database 128, and a social communication module 129.

The social communication module 129 includes a configuration set 122, a participant set 123, and a dictionary set 124. The social communication module 129 further includes a task module 125 and a conversation module 126.

The RTU 120 is arranged, in this example by means of the social communication module 129, for registering with a pre-selected social network platform according to the configuration set 122. And further arranged for creating and/or joining at least one participant group on the pre-selected social network platform based on the participant set 123. Thereto, the configuration set 122 contains configuration data for setting up the RTU for connecting to a social network platform. The participant set 123 contains participant data of authorized participant accounts and participant permissions. The participant data relates both to human users, such as operators, and to machine bots, such as other RTUs. The task module 125 contains data relating to requests, commands and associated tasks and task types.

Computer 200 includes an application tool 201 for configuring the RTU 120. Apart from general access and control of settings, parameters and the real time data base as is common, the configuration tool 201 is further arranged for setting up the RTU 120 for the social network 110. In this example, the general and social configuration tool are integrated, in other examples these may be implemented as separate configuration tools. Configuring of the RTU 120 includes loading and/or setting the data contained by the configuration set 122 and participant set 123. Thereto the RTU 120 executes a number of steps to retrieve required data from the configuration tool 201. The retrieval operation may include the configuration tool 201 to display input prompts to an operator to enter the required data. It may include loading a file containing RTU pre-sets specific to the automation system being set up. Or it may be a combination thereof, where the RTU 120 loads a particular file of pre-sets and prompts the operator to confirm the settings and data to be used.

The RTU 120 further includes an acquisition module 127 for acquiring data from the substation 150 and/or the SCADA 140. The RTU 120 further includes a database 128 for storing the acquired data, which allows to isolate the data acquisition and storage process from the data consuming process and thereby separates the industrial operation from the social network communication. In a preferred embodiment, the database 128 is only accessible to non-industrial operations processing in read mode, exclusively allowing write/store operations to the main industrial process. To this end, an Application Programming Interface, such as e.g. a Java API, may be arranged to expose the RTU database 128 to the social communication module 129 and/or to other data consumers.

The dictionary set 124 may include a Java database that is preferably implemented as a single object, such that it is accessible through an API available to all the modules of the RTU. The API would preferably also allow adapting and/or updating the content of the dictionary set. In addition, objects in the dictionary set may be ordered or grouped in logical list to alleviate querying; object identifiers may further enhance this.

The content of the dictionary set 124 preferably includes all concepts and sentences that may be exchanged in conversations between the RTU and a user or operator. This includes multiple sets of keywords and intermediate keywords. Intermediate i.e. partial keywords may be used as aid for parsing user input. Further included are pre-defined sentences and sub-sentences for response to user input or requests. These pre-defined sentences may allow for one or more arguments i.e. blanks to be filled in with parameter values, keywords, or further sub-sentences. Other content of the dictionary set may include technical terms relating to roles, devices and parameter magnitude and/or units, operator and participant names, such as e.g. present in the participant list.

The conversation module 126 includes scripts of conversations that describe a full exchange of expected requests and responses. Such conversations may be scripted or be of a more free-flowing Question & Answer or Request & Respond type. And may These conversations may be stored and/or created simply by reference to data entries of the dictionary set 124, such as words, phrases and/or sentences.

The task module 125 provides the association of requests and command processed by the conversation module 126 to tasks and task types available for the RTU. These would be the same tasks that would be available to a user or operator via the SCADA module 140 or PC 200. Or it could be a limited set of tasks thereof, depending on the permissions defined in the participant set 123. So, a request send by a participant sending to the RTU would be processed by the conversation module 126. Which in turn relies on dictionary set 124 to formulate a response to the participant and relies on the task module 125 to execute or act upon the request.

In the example of FIG. 2, the configuration set 122, the participant set 123, the dictionary set 124, the task module 125 and the conversation module 126 have been jointly presented as a social communication module 129. In other embodiments, these parts may be distributed, split, joined together or organized differently in various other ways.

Figure 3:
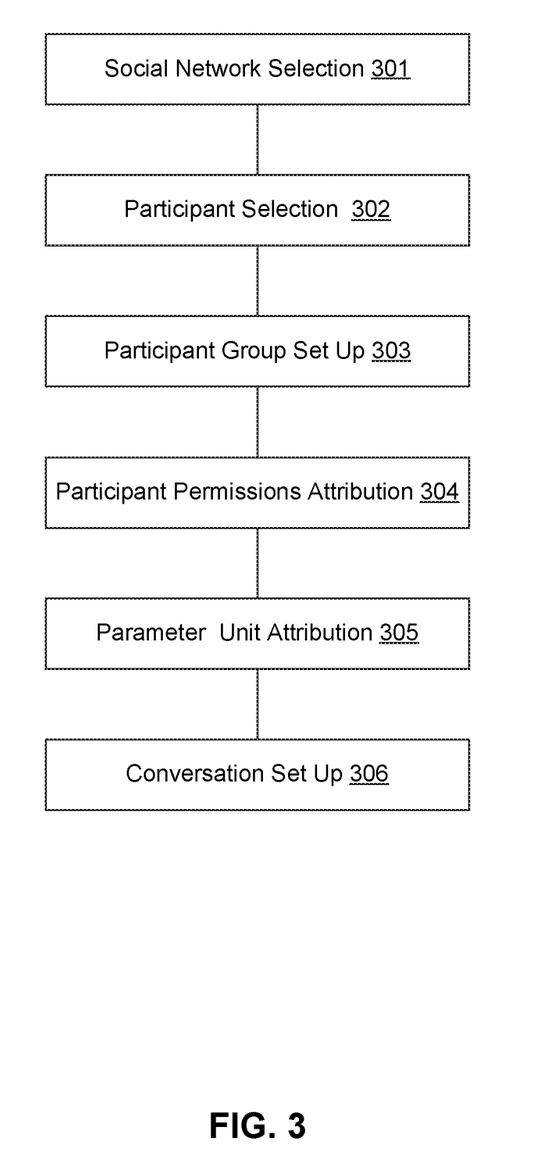
FIG. 3 illustrates an example of a method for configuring a Remote Terminal Unit in accordance with the invention.

Shown in FIG. 3 are actions processed by the RTU for obtaining data required to set up the RTU for a social network. The RTU 120 first retrieves from the social configuration tool 201 which social network platform has been selected 301. This may be any known platform, such as Telegram, Slack, Signal, ChatSecure, Facebook Messenger, Facebook Workplace, Twitter, WeChat, Skype or Yammer. Depending on the social network platform selection, an appropriate specific configuration set will be generated for the platform.

Further, the RTU 120 retrieves Participant selection 302 from the configuration tool 201. This includes the different types of participants, human operators and machine bots, and may further include for each possible participant an identifier, further credentials, possible aliases, a profile and/or role. The credentials of the RTU itself may be included in the participant selection, these may be included in the Configuration set or these may be provided in another manner, such as prior stored within the RTU itself.

Roles may be different per automation system, and for an electrical substation for example these may be one of the following:

Admin/System administrator: has full access to all information and actions.

CCChief/Control Center Chief: can check and modify the system behavior.

CCOperator/Control Center Operator: can check and receive event notifications.

MChief/Maintenance Chief: can receive some event notifications and request a subset of signals or notifications.

SecTech/Security Chief: receives security-related notifications of substation

Maintenance technician: receives maintenance notifications and equipment failure alarms Engineer/technical specialist: Permission to consult control parameters of the substation Quality technician: Notifications of control parameters of the substation, i.e: voltage, temperature.

Telecommunications manager: Notifications of the state of the telecommunication network, RTU and connections.

Firefighting personnel: Event alarms in substation, i.e. overcurrent, shutdown, high temperature With the Social Network Selection 301 and Participant Selection 302 retrieved, the RTU continues by retrieving Participant Group Set Up 303. This may include a group name, a group identifier, a group type and/or a list of group participants. On some social network platforms the group name may serve as a group identifier. On certain social network platforms, instead of group functionality there may be a subscription list available. Thus, depending on the platform, various types of groups or group functionalities may be supported. These groups may be one or more of the following types: a Private group indicating participation is restricted to invitation only, a Unidirectional public channel indicating messaging from a bot to any user, and/or a Subscription list indicating the lack of support for group functionality.

The list of group participants includes the participants intended to be joined to the group. The participants in the list may be identified by a name or by other identifiers such as a phone number, an alias, an IP-address, or the like. The identified participants may be picked from among the participants retrieved during the Participant Selection 302. Furthermore, it may be that more than one participant group is to be set up.

Continuing, permissions attributed to the participants are retrieved 304. These permissions relate to a set of predefined actions that require permission for complying with certain levels of security. The following list gives an example of such actions:

Signal value querying
Device value querying (for status, condensed reports and location)
Reading and modification of current notifications
Reading and modification of current periodic tasks and reports
Log querying
Device list querying
Point list querying
Maintenance availability checking
Next maintenance check date querying
Special tasks (e.g. user and group management)

The data retrieved by the Participant Permissions Attribution 304 may be linked to the roles previously specified. This enables an automated processing of the permissions attributed to participants based on their role.

For any communications including signal information that convey a parameter value, it is also required to be able to identify the proper unit of the parameter, such as current, voltage, or frequency. Thereto, in the example of FIG. 3, Parameter Unit Attribution 305 is retrieved. The retrieved attribution data will indicate which machine bots may communicate which parameters and associated units. In addition, it may be indicated which electronic equipment and other devices will convey which type of parameters.

Shown in the example of FIG. 3 as a final step, data for Conversation Set Up 306 may be retrieved. This will obtain data indicating types of pre-arranged notifications, schedules, and conversation. Such conversations may be scripted or be of a more free-flowing Question & Answer or Request & Respond type. The data is preferably stored in the conversation module 126. Conversation data may include scripts of conversations that describe a full exchange of expected requests and responses. Machine learning and/or Artificial Intelligence may be employed for learning and improving the conversation processing. Also, conversations may be updated over time through the configuration tool 201 to deal with newly developed analytical processes. For example, if over time further insights lead to additional or changes in requests for specific data, The data retrieved from the social configuration tool 201 for Social Network Selection 301 and Conversation Set Up 306 is stored and available via the configuration set 122. The data retrieved from the social configuration tool 201 for Participant Selection 302, Participant Group Set Up 303 Participant Permissions Attribution 304, and Parameter Unit Attribution 305 is stored and available via the participant set 123.

In the manner as described above in relation to the example of FIG. 3, one configuration set 122 for a social network platform is provided. And one participant set 123 that includes a list of authorized participant accounts and participant permissions is provided. In other examples, multiple participant sets for the same Social Network may be provided. Furthermore, multiple configuration sets for different Social Networks may be provided. For which then multiple participant sets for the different Social Network may be provided.

The data contained by the dictionary set 124 may be provided as described in relation to the configuration set 122 and participant set 123 by the social configuration tool 201. Or it may be provided in other ways such as e.g. preloaded during production of the RTU 120 or downloaded from another source.

Figure 4:
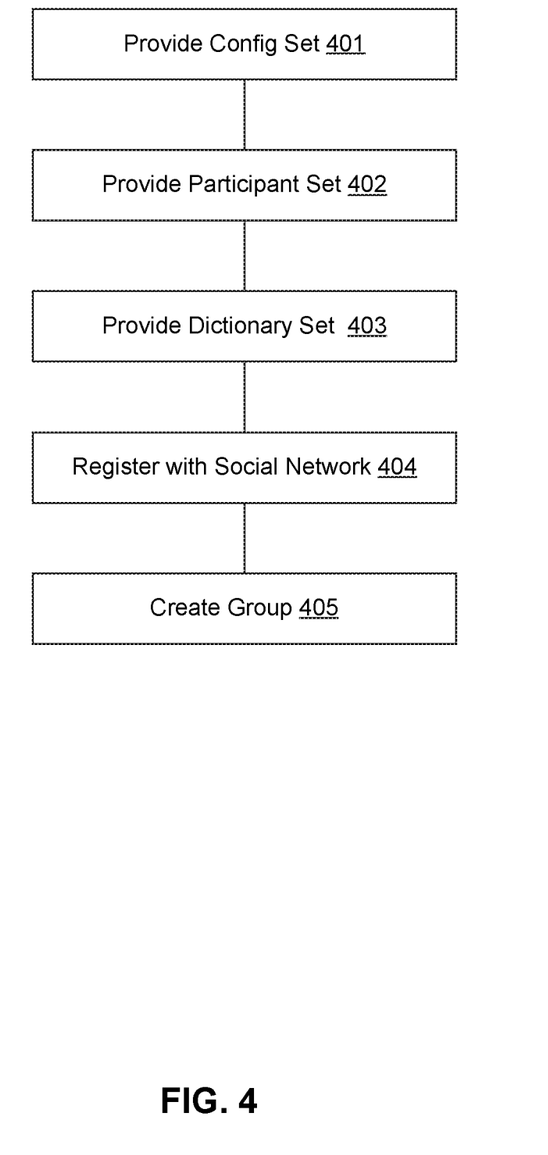
FIG. 4 illustrates an example of a method for setting up a Remote Terminal Unit for social networking in accordance with the invention.

Turning to FIG. 4, an example of a method is shown for setting up an electrical substation Remote Terminal Unit for social networking. The method includes providing 401 a configuration set for a social network platform and providing 402 a participant set comprising a list of authorized participant accounts and participant permissions. Of both these steps examples of how to implement have been described above in relation to FIG. 3. The method further includes providing 403 a dictionary set comprising requests, commands and associated tasks and task types. With the configuration set, participant set and dictionary set provided, the method continues with registering 404 with the social network platform according to the configuration set. Registering of the RTU with the social network platform 404 includes the RTU to initiate installing an application of the selected social network platform. This social network application will run as an instance on the RTU. The RTU will identify itself through its' credentials to set itself up as a user. Thereafter, it will continue by creating 405 at least one participant group on the social network platform based on the participant set. And/or it may continue by joining 405 at least one participant group on the social network platform based on the participant set.

With one or more participant groups created, the RTU will start inviting other intended participants in accordance with the list of group participant. In case a participant group was joined by the RTU, it will start checking the identity and permissions of the other participants.

The RTU will keep track of all participants within a group to ensure compliance with security policies. For example, when an unidentified or unauthorized participant is detected, the RTU may respond by issuing a warning message, by leaving/exiting the group, dissolving or deleting the group, or, if the RTU group administrator rights to kick or ban that unidentified or unauthorized participant.

Furthermore, the RTU will keep track of any participant leaving the group, as this may indicate a malfunction or security risk at the side of the participant that has left.

Some examples of the reporting or diagnostic conversations that may be possible with an RTU and method according to the invention are given below.

Example 1: Conversation about Supply Voltage

In this example, the RTU asks first about the supply voltage status, and then compares its own voltage values and oscillations with these of the other RTU:

RTU_FE_2: Hey RTU_FE_4, are you there?

RTU_FE_4: Yes RTU_FE_2, do you want something?
RTU_FE_2: What is your primary supply status?
RTU_FE_4: My primary supply is fine (RTUFE4_PS1 is OK).
RTU_FE_4: And what is your primary supply status?
RTU_FE_2: My primary supply is fine too (RTUFE2 PS1 is OK).
RTU_FE_2: What is your primary supply voltage?
RTU_FE_4: My primary supply voltage is 5.38 V. And yours?
RTU_FE_2: My primary supply voltage is 5.43 V.
RTU_FE_2: Did you detect an abnormal value recently?
RTU_FE_4: No, as far as I know the primary supply voltage remained stable. And you?
RTU_FE_2: I detected one drop (5.23 V on 2017-09-13 03:44), but now the primary supply voltage is stable.
RTU_FE_2: Thank you!

Example 2: Conversation about Temperature

In the following example, the RTU asks first about the other RTU's temperature, and then asks all RTU's about their temperature oscillations:
RTU_FE_2: Hey RTU_FE_4, are you there?
RTU_FE_4: Yes RTU_FE_2, do you want something?
RTU_FE_2: What is your temperature?
RTU_FE_4: My temperature is 59° C.
RTU_FE_4: And what is your temperature?
RTU_FE_2: My temperature is 61° C.
RTU_FE_2: Did you detect an abnormal value recently?
RTU_FE_4: No, as far as I know the temperature remained stable. And you?
RTU_FE_2: I detected 2 rises (71° C. on 2017-09-13 16:45 and 80° C. on 2017-09-13 18:07), but now the temperature is stable.
RTU_FE_2: Is there any RTU with temperature problems?
RTU_ACQ_5: I detected a rise (75° C. on 2017-09-14 11:08), and the value is still high!
RTU_FE_2: OK, I think Maintenance should take care of this.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A computer implemented method for setting up a Remote Terminal Unit in a substation to perform, control, or supervise processes via social networking, comprising:
retrieving from a computer hosting a configuration tool, a configuration set for a social network platform;
providing a participant set comprising a list of authorized participant accounts and participant permissions;
providing a dictionary set comprising requests, commands and associated tasks and task types;
accessing social network communication data, which is non-industrial process data, in a read only mode in a database in the Remote Terminal Unit;
registering with the social network platform according to the configuration set, by installing and running an application of a selected social network platform;
creating and/or joining the selected social network platform, at least one participant group on the social network platform based on the participant set; and
acquiring main industrial process data from the substation and write/storing the main industrial process data in the database, isolated from read only accesses of the social network communication data.

2. A method according to claim 1, wherein:
providing a configuration set comprises obtaining input provided during selection of a social network from a configuration tool.

3. A method according to claim 1, wherein providing a participant set comprises:
obtaining selection input provided during selection of participants from a configuration tool;
retrieving authorised accounts and permissions for each participant;
retrieving participant identifiers, credentials, aliases, profiles and/or roles; and
storing the selection input, the authorised accounts and permissions for each participant, and the participant identifiers, credentials, aliases, profiles and/or roles in the participant set.

4. A method according to claim 1, wherein creating a participant group comprises:
obtaining group input provided during Participant Group Set Up from the configuration tool;
obtaining permission input provided during Participant Permissions Attribution;
obtaining parameter input provided during Parameter Unit Attribution; and
storing the group input, the permission input, and the parameter input in the participant set.

5. A method according to claim 1, further comprising:
prior to initiating a conversation, responding to requests and/or sending request, checking and/or confirming the participant against a security policy.

6. A method according to claim 1, further comprising:
deploying a security policy by enforcing the participant permissions.

7. A remote terminal unit arranged in a substation to perform, control, or supervise processes via social networking, comprising:
a configuration set retrieved from a computer hosting a configuration tool, comprising configuration data for a social network platform;
a participant set comprising a list of authorized participant accounts and participant permissions;
a dictionary set comprising requests, commands and associated tasks and task types;
a database in the remote terminal unit, configured for read only and for write/store operations, and
a controller arranged for:
accessing social network communication data, which is non-industrial process data, in a read only mode in the database in the remote terminal unit;
registering with the social network platform according to the configuration set, by installing and running an application of a selected social network platform;

creating and/or joining the selected social network platform, at least one participant group on the social network platform based on the participant set; and acquiring main industrial process data from the substation and write/storing the main industrial process data in the database, isolated from read only accesses of the social network communication data;

wherein the controller is a main communication controller configured to perform computer implemented functions at least of accessing social network communication data, registering with the social network platform according to the configuration set and creating and/or joining at least one participant group on the social network platform based on the participant set, acquiring main industrial process data and write/storing the main industrial process data in the database.

8. A remote terminal unit according to claim 7, wherein the controller is further arranged for deploying a security policy by enforcing the participant permissions.

9. A remote terminal unit according to claim 7, further comprising:

a task module comprising data relating to requests, commands and associated tasks and task types; and a conversation module comprising data relating to scripts of conversations describing exchange of expected requests and responses.

10. A remote terminal unit according to claim 7, further comprising:

an acquisition module for acquiring data from a substation and/or a SCADA module; and a database for storing data acquired by the acquisition module.

11. An automation system, comprising:

a remote terminal unit according to claim 7;

a SCADA module; and the computer hosting the configuration tool.

* * * * *